June 19, 1951 G. DIEMER ET AL 2,557,178
INPUT DAMPING COMPENSATED AMPLIFIER
Filed Feb. 19, 1949
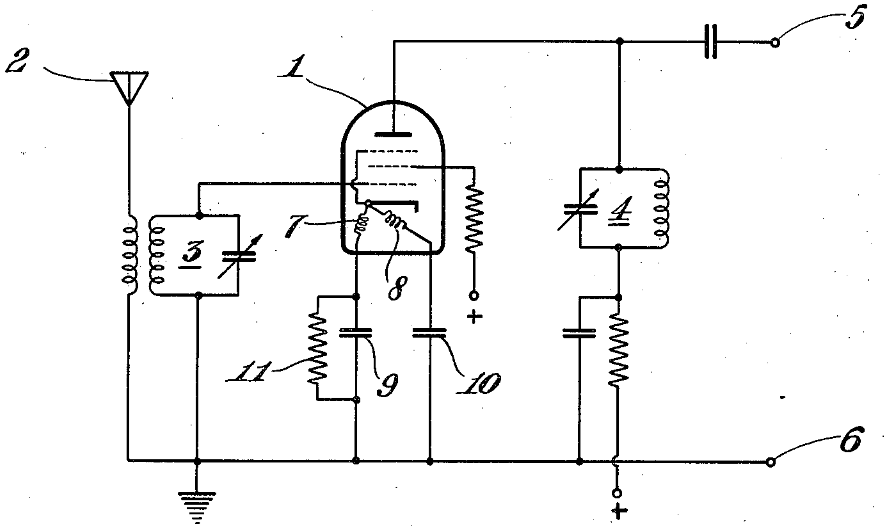
INVENTORS.
GESINUS DIEMER
KORNELIS SWIER KNOL
BY [signature]
AGENT.

Patented June 19, 1951 2,557,178

UNITED STATES PATENT OFFICE 2,557,178

INPUT DAMPING COMPENSATED AMPLIFIER

Gesinus Diemer and Kornelis Swier Knol, Eindhoven, Netherlands, assignors to Hartford National Bank and Trust Company, Hartford, Conn., as trustee Application February 19, 1949, Serial No. 77,372
In the Netherlands April 21, 1948

2 Claims. (Cl. 179—171)

The invention relates to a circuit-arrangement for amplifying electrical high-frequency oscillations.

In such circuit-arrangements the input damping of the discharge tubes used for amplification is often troublesome. This damping is due inter alia to the natural inductance of the supply lead to the cathode, which inductance has set up across it a voltage of the frequency of the oscillations to be amplified which leads by about 90° with respect to the alternating voltage fed to the control-grid of the discharge tube concerned and which sets up a current flowing from the control-grid to the cathode through the natural capacity between these electrodes, said current being approximately in phase with the control-grid alternating voltage and hence setting up a damping of the input circuit.

It is known to obviate this disadvantage by including in the supply lead to the cathode a condenser with the use of which this lead is tuned, at least approximately, to the frequency of the oscillations to be amplified, so that the impedance of the lead is reduced to a minimum, it being required to shunt the said condenser by a resistance or an inductance through which the direct current can be supplied to the cathode. The resistance often produces an unwanted damping of the said circuit, adjusted to series-resonance and the use of an inductance may result in an unwanted parallel-resonance.

It is furthermore known to reduce the damping of the input circuit, which is due to the natural inductance of supply lead to the cathode by using for amplification a discharge tube, of which the cathode is provided with at least two supply leads which are completely separated from one another as far as high-frequency currents are concerned and by connecting one of the said supply conductors through the input circuit to the control-grid and the other through the output circuit to the output electrode. This measure permits of the input damping due to the natural inductance being substantially obviated, but has a limitation in that the input circuit and the output circuit cannot both be connected to earth potential, since simultaneous earthing of input and output impedances would involve the necessity for the two supply conductors to be connected in parallel, the desired effect being thus counteracted. However, in practice it is frequently desirable to earth both the input circuit and the output circuit, particularly when they are tuned with the use of variable condensers. In view thereof it has already been suggested for a circuit-arrangement for amplifying electric high-frequency oscillations comprising a discharge tube the cathode of which is provided with at least two supply conductors, to arrange for one of these conductors to include a condenser with the use of which it is tuned, at least approximately, to the frequency of the oscillations to be transmitted and to supply the direct cathode current through a resistance included in one of the other conductors. The said resistance, which serves to produce a negative bias for the control-grid of the tube, may be shunted by a condenser of high capacity which constitutes a short-circuit for the oscillations to be amplified.

Although this circuit-arrangement ensures satisfactory results, it is not efficient where the amplifier is required to be adjustable over a large frequency range, since the variation of damping with frequency is determined by the construction of the tube and cannot be adjusted as desired in any particular case, at least if a fixed condenser is used for adjustment of the first-mentioned conductor.

The invention has for its object to obviate this difficulty and to provide an amplifier for ultra high-frequency oscillations in which no excessive damping in the input circuit occurs and in which a favourable variation of the damping is ensured in a simple manner when an extensive range of frequencies can be amplified.

According to the invention, in a circuit-arrangement for amplifying ultra-high frequencies, in which the amplifying tube is constituted by a tube, the cathode of which is provided with two supply leads, the two leads comprise series condensers, preferably fixed series condensers, whose impedances for the oscillations to be amplified are of the same order of magnitude as those of the natural inductances of the leads. These condensers may be tuned, for example with the use of the natural inductances of the leads, to frequencies lying in the range to be amplified, the condensers preferably having identical or almost identical capacity values and being capable of being adjusted once for all to a fixed value. The circuit-arrangement according to the invention is suitable for amplifying extensive ranges of ultra-high frequencies and in this case preferably both condensers are adjusted in such manner that the leads are in resonance at an approximately central frequency of the range to be amplified. The direct current is supplied to the cathode through a resistance which shunts one of the condensers. It has been found that the resulting damping of the associated series resonance circuit is of no importance. The damping of the input circuit varies little with the frequency throughout the range.

The use of the invention permits of connecting both the input circuit and the output circuit of the amplifier to earth potential. The circuit-arrangement according to the invention has the additional advantage over a circuit-arrangement comprising a single cathode lead which has been tuned to the frequencies to be amplified that the damping of the input circuit is materially smaller.

In order that the invention may be more clearly understood and readily carried into effect, it will now be described more fully with reference to the accompanying drawing, the single figure of which shows one embodiment thereof.

A pentode 1 serves for amplifying ultra-high frequencies. The oscillations to be amplified are fed inductively from an aerial 2 to an oscillatory input circuit 3 tuned to the frequency of said oscillations and connected between the control-grid of the tube 1 and earth. The anode circuit of the tube 1 includes an output circuit 4, which is also tuned to the frequency of the oscillations to be amplified and from which the amplified voltages are taken across terminals 5 and 6.

The cathode of the tube 1, which is preferably of the indirectly heated type, is provided with two supply leads, of which the natural inductances are designated 7 and 8. A condenser 9 is connected in series with 7 and a condenser 10 in series with 8. Condenser 9 is connected in parallel with a resistance 11 which allows the passage of the direct current of the cathode and which also serves to supply a suitable negative bias voltage to the control-grid of the tube 1. The value of this resistance will generally be some few hundreds of ohms.

The capacities 9 and 10 have such values that the associated leads are tuned to frequencies lying within or near the frequency range to be amplified. The impedances of the said capacities for the oscillations to be amplified will be in addition of approximately the same value as those of the supply leads. In such a circuit-arrangement adjustment of the condensers 9 and 10 permits, within certain limits, of providing the damping of the input circuit to be such that it has a definite desired variation with frequency.

If the circuit-arrangement is required to serve for amplifying a comparatively wide frequency range, for example a range extending from 20 to 120 mc./s., the condensers 9 and 10 may both be adjusted to a value at which the associated supply leads are tuned to a frequency lying within the said range, for example, to 45 mc./s. If the natural inductances 7 and 8 (which are primarily constituted by the inductances of the leads inside the envelope and within the foot of the tube) are identical, as will generally be the case, the values of the capacities 9 and 10 will also be identical, viz. some few hundreds of pfs. At frequencies exceeding the said tuning frequency the supply leads behave inductively, so that some damping of the input circuit will occur, which, however, owing to the parallel combination of the two leads, is smaller than in the known circuit-arrangement having a single tuned cathode lead. At lower frequencies the leads behave capacitatively and reduction in damping occurs which, however, as has been found, is not bound to give rise to an instability.

What we claim is:

1. An electrical circuit arrangement for amplifying ultra-high frequency signals having frequency values lying within a given range, comprising an electron discharge tube having an input circuit comprising a cathode electrode, a first supply lead having one end thereof internally coupled to said cathode electrode and having a first given inductive reactance value, a second supply lead having one end thereof internally and separately coupled to said cathode electrode and having a second given inductive reactance value, a first capacitive element having a first capacitive reactance value substantially equal to said first inductive reactance value and being interposed in said first supply lead to tune said first supply lead to a frequency substantially in the center of said given range, a second capacitive element having a second reactive value equal to said second inductive reactance value and being interposed in said second supply lead to tune said second supply lead to a frequency substantially in the center of said given range, means to interconnect the other ends of said supply leads, and an output circuit coupled to said discharge tube.

2. An arrangement, as set forth in claim 1, further including a resistive element connected across one of said capacitive elements.

GESINUS DIEMER.
KORNELIS SWIER KNOL.

REFERENCES CITED

The following references are of record in the file of this patent:

UNITED STATES PATENTS

| Number | Name | Date |
|---|---|---|
| 2,341,346 | Summerhayes | Feb. 8, 1944 |
| 2,373,184 | Herold | Apr. 10, 1945 |
| 2,444,864 | Van Der Ziel | July 6, 1948 |